United States Patent [19]
Ligneul et al.

[11] Patent Number: 5,969,263
[45] Date of Patent: Oct. 19, 1999

[54] ULTRASONIC FLUID COUNTER FOR ATTENUATING PARASITIC ULTRASONIC WAVES

[75] Inventors: Patrice Ligneul, Chavilles; Philippe Hocquet, Oslo; Benoit Froelich, Marly le Roi, all of France

[73] Assignee: Schlumberger Industries, S.A., Montrouge, France

[21] Appl. No.: 09/012,313

[22] Filed: Jan. 23, 1998

[30] Foreign Application Priority Data

Apr. 8, 1995 [FR] France ................................ 95 05600
Jan. 8, 1996 [FR] France .................... PCT/FR96/01220

[51] Int. Cl.$^6$ ........................................................ G01F 1/66
[52] U.S. Cl. ........................................................ 73/861.25
[58] Field of Search ........................... 73/861.25, 861.26, 73/861.27, 861.28, 861.29, 861.31

[56] References Cited

U.S. PATENT DOCUMENTS

| | | | |
|---|---|---|---|
| 2,708,366 | 5/1955 | Blocher et al. | 73/861.31 |
| 3,964,309 | 6/1976 | Husse et al. | 73/861.28 |
| 4,104,915 | 8/1978 | Husse | 73/861.28 |
| 4,144,752 | 3/1979 | Lolk | 73/861.28 |
| 4,325,262 | 4/1982 | Meisser et al. | 73/861.28 |
| 4,365,518 | 12/1982 | Zacharias, Jr. | 73/861.31 |
| 5,001,936 | 3/1991 | Baumoel | 73/861.28 X |
| 5,131,278 | 7/1992 | Baumoel | 73/861.28 X |
| 5,168,762 | 12/1992 | Gil | 73/861.28 |
| 5,243,863 | 9/1993 | Gill | 73/861.28 |
| 5,383,369 | 1/1995 | Khuri-yakub et al. | 73/861.29 |
| 5,440,937 | 8/1995 | Lynnworth et al. | 73/861.27 X |
| 5,458,004 | 10/1995 | Van Der Pol | 73/861.29 |
| 5,515,733 | 5/1996 | Lynnworth | 73/861.27 |
| 5,650,572 | 7/1997 | Vontz | 73/861.27 X |
| 5,777,237 | 7/1998 | Collier et al. | 73/861.27 X |

*Primary Examiner*—Richard Chilcot
*Assistant Examiner*—Jewel Thompson
*Attorney, Agent, or Firm*—Leonard W. Pojunas

[57] ABSTRACT

The invention concerns an ultrasonic fluid counter including at least two ultrasonic transducers collectively defining an ultrasonic measuring path and emitting and receiving ultrasonic waves in the fluid along said ultrasonic measuring path according to at least one ultrasonic frequency, wherein attenuation means for attenuating parasitic ultrasonic waves generated outside said fluid counter and transmitted by the fluid according to the ultrasonic frequency or frequencies are associated with the fluid counter.

15 Claims, 10 Drawing Sheets

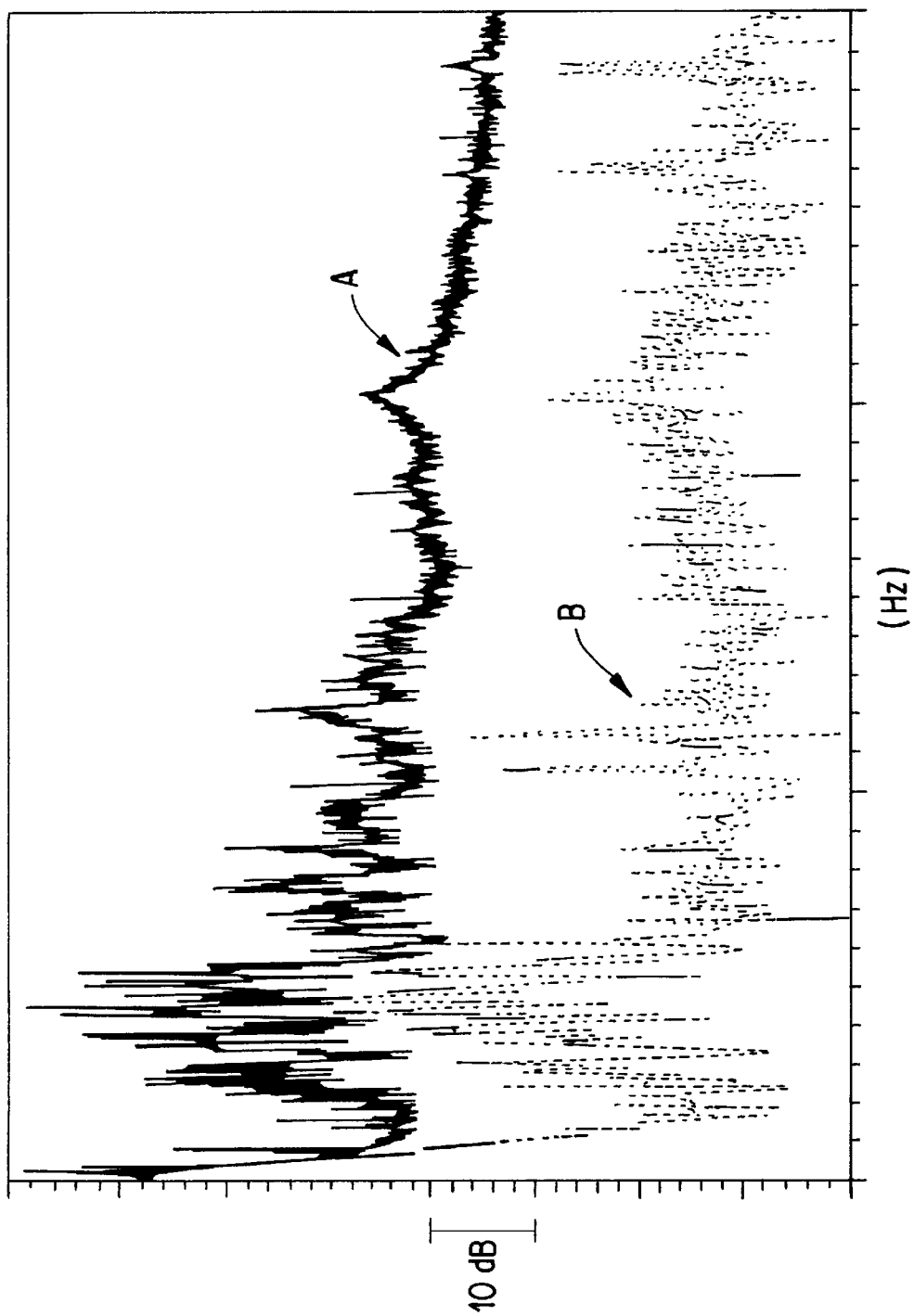

ULTRASONIC FLUID COUNTER FOR ATTENUATING PARASITIC ULTRASONIC WAVES

FIELD OF THE INVENTION

The invention concerns an ultrasonic fluid counter including ultrasonic transducers collectively defining an ultrasonic measuring path and emitting and receiving ultrasonic waves in the fluid along said measuring path according to at least one ultrasonic frequency.

BACKGROUND OF THE INVENTION

For a large number of years, the speed of a flowing fluid has been measured by transmitting from ultrasonic transducers the ultrasonic waves in the fluid in the direction of flow of said fluid and in an opposite direction and by measuring the respective propagation of the waves emitted in both directions.

On the basis of the measurement of the speed of the fluid, it is easy to determine its flow and the volume of fluid which has flowed at the end of a given time. The ultrasonic fluid counters, when installed on site, can be placed next to a pressure regulator.

Pressure regulators are able to reduce the pressure of a gas of several bars to about 20 mbars upstream of ultrasonic gas counters.

Now, the fall of pressure in the regulator is a source of considerable noise and it has been observed that this fall of pressure may provoke parasitic ultrasonic waves having a high pressure amplitude and whose frequency or frequencies correspond to those of the ultrasonic transducers of the counter.

These parasitic ultrasonic waves are transmitted through the flow of the fluid as far as the ultrasonic transducers. This results in having significant measuring errors which are totally unacceptable.

One logical solution would consist of increasing the amplitude of the ultrasonic waves emitted by the transducers, provided the level of the noise generated by the regulator is not too high.

However, the increase of amplitude is technologically limited.

Another solution would consist of increasing the transmission frequency of the ultrasonic transducers, but this would result in increasing the energy consumption of the counter, which constitutes a drawback when operating on batteries.

In addition, the transmission frequency of the transducers can only be increased within certain limits, beyond which the transducers need to be replaced by higher frequency transducers. However, these transducers represent a change of technology with respect to the former transducers which sometimes risks questioning the characteristics of the ultrasonic measuring path and the electronics associated with said counter.

SUMMARY OF THE INVENTION

The object of the present invention is to resolve the problem referred to above by offering an ultrasonic fluid counter including:

fluid intake and evacuation openings, at least two ultrasonic transducers collectively defining an ultrasonic measuring path and transmitting and receiving ultrasonic waves in the fluid along said ultrasonic measuring path according to at least one ultrasonic frequency, means for attenuating the parasitic ultrasonic waves generated outside said fluid counter and transmitted by the fluid according to the ultrasonic frequency(cies), said means being disposed between the external source and the ultrasonic measuring path and being made, at least partly, of a material absorbent to the ultrasonic frequency(cies) used in the counter, wherein said counter includes between one of the openings and the ultrasonic measuring path a chamber in which the means for attenuating the parasitic ultrasonic waves are disposed.

In the present text, <<attenuation>> is generally intended to be attenuation to the frequency/frequencies used in the counter for the ultrasonic measuring of parasitic ultrasonic waves.

Thus, by attenuating the amplitude of the parasitic ultrasonic waves in a chamber inside the counter, it is possible to ensure that these parasitic waves do not disturb the ultrasonic transducers.

According to one characteristic of the invention, the means for attenuating the parasitic ultrasonic waves are placed in the chamber so as to offer said waves multiple reflections on the absorbent material.

According to one embodiment of the invention, the attenuation means include one input and one output for flowing of the fluid and serve as a screen between the input and the output for the parasitic ultrasonic waves.

The attenuation means have walls made of a material absorbing the ultrasonic waves. The walls of the attenuation means can be warped towards the inside of said means so as to serve as a screen between the input and output of the means for the parasitic ultrasonic waves.

According to another embodiment, the attenuation means include one input and one output for flowing of the fluid and include at least one obstacle disposed between the input and the outlet so as to serve as a screen between the input and the output for the parasitic ultrasonic waves. The obstacle may be a material absorbing the ultrasonic waves.

According to preferred characteristics of the invention:

the obstacle is placed opposite the input, the obstacle separates the fluid flow derived from the input into at least two flows. The fact of separating the flow makes it possible to retain relatively large passage sections and thus retain a relatively slight load loss.

the obstacle has opposite the input a profiled form extending towards said input so as to favour separation of the flow.

the obstacle has opposite the outlet a profiled form extending towards the output.

the obstacle has a shape enabling the flow to circulate fully around said obstacle.

The obstacle may include a portion which reflects the ultrasonic waves. It is also possible for the entire obstacle to be made of a material reflecting the ultrasonic waves to the ultrasonic frequency(cies) used in the counter.

When the noise source outside the counter is situated upstream (respectively downstream) of said counter, the attenuation means are disposed upstream (respectively downstream) of the ultrasonic measuring path.

Furthermore, it is quite possible to have the attenuation means upstream of the ultrasonic measuring path, as well as downstream.

According to another embodiment of the invention, the counter includes an axial measuring pipe in which the fluid flows from upstream to downstream and with a portion with one extremity penetrating into a measuring chamber over a certain length, the material absorbing the parasitic ultrasonic waves being disposed in said measuring chamber on at least one portion of the penetrating length of the measuring pipe including said extremity and so as to provide outside said measuring pipe at least one space in which the fluid flows parallel to the axis of this pipe in the opposite direction of the flow of the fluid in said pipe.

Accordingly, the fluid is in contact with the material absorbing the parasitic ultrasonic waves over a considerable length along the measuring pipe which favours multiple reflections of said waves on the material and thus strongly attenuates the amplitude of these waves.

Moreover, given the fact that this attenuation takes place in the measuring chamber immediately upstream or downstream of the measuring path (depending on the localisation of the external source of the noise), the measuring path shall not be distributed by these parasitic waves.

This embodiment is even more effective than the embodiments in which the attenuation means are further from the measuring path, as in these embodiments one portion of the ultrasonic waves may nevertheless be propagated by the metallic structure of the counter and thus reach the measuring path via a diverted route avoiding said attenuation means.

According to this embodiment, a peripheral space is provided around the measuring pipe, the material absorbing the parasitic ultrasonic waves being in contact with the walls of the measuring chamber.

Again in this embodiment, the material absorbing the ultrasonic waves is in contact with firstly the walls of the measuring chamber and secondly with the measuring pipe so as to provide two spaces in the form of channels situated on both sides of said measuring pipe.

In particular, the material absorbing the ultrasonic waves fully encompasses the measuring pipe so as to ensure that the channels are not in contact with said measuring pipe.

Accordingly, the fluid flow in each channel is totally surrounded by the material absorbing the parasitic ultrasonic waves which further increases the effectiveness of attenuation.

BRIEF DESCRIPTION OF THE DRAWINGS

Other characteristics and advantages shall appear more readily from a reading of the following description given by way of non-restrictive example and with reference to the accompanying drawings on which:

FIG. 17 shows two curves A and B which translate the noise spectrum measured downstream of the ultrasonic gas counter of FIG. 1 without any system for attenuating the parasitic ultrasonic waves (curve A) and with the system for attenuating the parasitic ultrasonic waves shown on FIGS. 2a and 2b (curve B) respectively, FIGS. 18a and 18b respectively represent two ultrasonic signals received by an ultrasonic transducer following transmission by another transducer in the gas counter shown on FIG. 1 in the presence of a given external noise source without any means for attenuating the parasitic ultrasonic waves (FIG. 18a) and with the attenuation means shown on FIG. 11a (FIG. 18b)

DETAILED DESCRIPTION OF THE PREFERRED EMBODIMENTS

Figure 1:
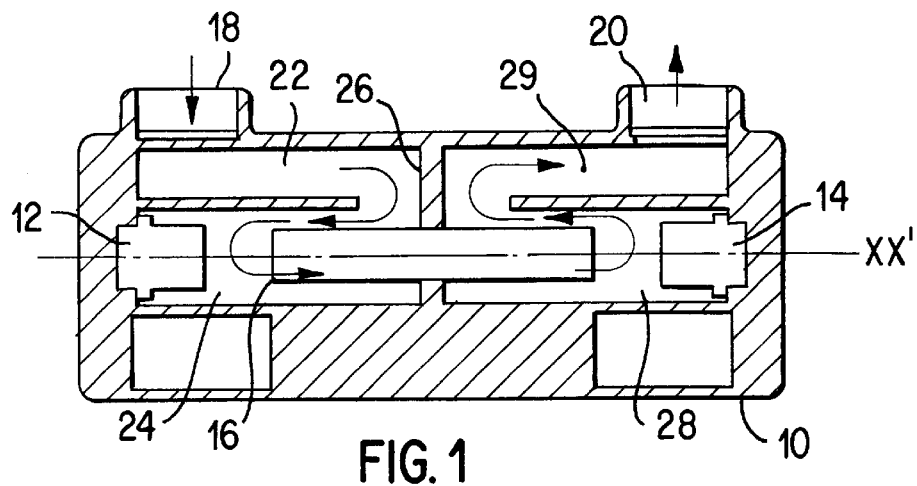
FIG. 1 is a longitudinal cutaway diagrammatic view of a configuration of an ultrasonic gas counter.

FIG. 1 is a diagrammatic longitudinal cutaway view of an ultrasonic gas counter 10 in which two ultrasonic transducers 12, 14 are disposed at the two opposing extremities of a cylindrical measuring pipe 16 and collectively defining a longitudinal ultrasonic measuring path inside the fluid which flows in said pipe.

Each transducer transmits and receives ultrasonic waves which propagate in the fluid at an ultrasonic frequency of about 40 kHz.

It is to be noted that the invention is not limited to a particular disposition and number of the ultrasonic transducers or even to their use frequency or frequencies. For example, the shape of the pipe may be an aperture having a rectangular transverse section and the transducers can be disposed in said pipe on one of the walls, as described in the patent application WO 91 09 280.

It is also possible to use more than two ultrasonic transducers, as described in the patent application DE 42 41 225.

According to this figure, the counter 10 comprises a body connected to a U-shaped inlet 18 and outlet 20 for the gas. The gas flow coming from the inlet 18 opens into a first chamber 22, traverses this longitudinal chamber along the axis XX' of the ultrasonic measuring path and flows into a small second chamber housing one 12 of the ultrasonic transducers and a first portion of the measuring pipe 16.

A wall 26 separates the body of the counter into two parts and is traversed by the measuring pipe 18. Thus, the only possible passage for the gas between the inlet and the outlet of the counter is embodied by means of the measuring pipe 16.

At its inlet in the second chamber 24, the gas flow turns a bend at 180°, passes alongside the first portion of the measuring pipe 16 along the longitudinal direction XX' by moving away from the wall 26, then moves round another bend at 180° and enters said pipe 16. The gas flow passes through the measuring pipe 16 and opens into a small third chamber 28 housing the transducer 14 and the second portion of the measuring pipe 16.

On leaving the measuring pipe, the gas flow moves round a bend at 180°, passes alongside the second portion of the pipe along the longitudinal direction XX' towards the wall 26 and leaves this chamber 28 by moving round another 180° bend. The flow then enters a fourth chamber 29 where it longitudinally moves along the axis XX' by moving away from the wall 26 and enters the outlet 20 of the counter. As shown on FIG. 1, the counter is symmetrical with respect to the plane containing the wall 26 and perpendicular to the axis XX'. A pressure regulator (not shown) is placed upstream of said counter and represents the source of external noise which generates in particular the parasitic ultrasonic waves which propagate in the gas flow in particular with a 40 Hz frequency and which has a sufficiently high pressure amplitude to disturb the ultrasonic measurements made between the transducers 12 and 14.

So as to avoid any of risks of interference, means for attenuating the amplitude of the parasitic ultrasonic waves are associated with the counter and is placed between the pressure regulator and the ultrasonic measuring path. For reasons of clarity, these attenuation means are not shown on FIG. 1. For example, the means for attenuating the ultrasonic parasitic waves are disposed in the first chamber 22 of the counter.

However, it is preferable that the attenuation means do not form part of the counter and are placed upstream of the inlet 18 and downstream of the noise source.

Figure 1A:
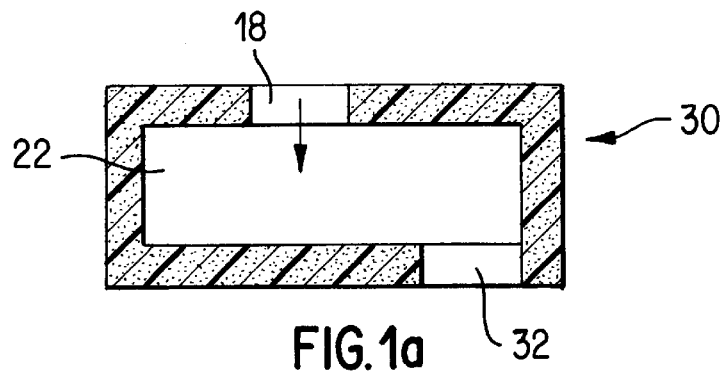
FIG. 1a is an enlarged cutaway diagrammatic view of a first embodiment of the means for attenuating the parasitic ultrasonic waves disposed in the chamber 22 of FIG. 1 within the same plane as that of FIG. 1.

As shown on FIG. 1*a*, according to a first embodiment of the invention, the means 30 for attenuating the ultrasonic parasitic waves are formed of a chamber which corresponds to the first chamber 22 of the counter and comprise a inlet corresponding to the inlet 18 of said counter which and an outlet 32 which corresponds to the opening between the first 22 and second 24 chambers of FIG. 1. FIG. 1*a* is situated inside the same plane and is an enlarged view of the chamber 22 of FIG. 1.

The chamber 22 is provided with walls made of a material absorbing the ultrasonic waves at the frequency of the ultrasonic waves transmitted between the transducers.

This absorbent material has a porous structure and the size of the pores is selected so as to provoke the desired attenuation. For example, a material having an attenuation characteristic of about 15 decibels per centimeter at 40 Hz is selected. This material is for example a polyurethane foam which is a isocyanate and polyalcohol mixture whose density varies between 30 and 80 Kg/m$^3$.

The consistence of the foam may be flexible or even rigid.

For example, the polyurethane foam is obtained by mixing in equal quantities Isorob O58 and Isothane 1320 commercialised by the ROBBE S. A. company situated in Venette B. P. 609, 60208 Compiègne, France.

For a wall made of an absorbent material, a thickness for example of about 5 mm is selected.

The fact of associating the gas counter with a chamber of this type enables the parasitic ultrasonic waves propagated by the flow coming from upstream to be deflected several times onto the absorbing material constituting the walls and therefore attenuate the amplitude of these waves. It is thus possible to attenuate the noise level by 20 decibels.

The inlet 18 and the outlet 32 of said chamber 22 may also be aligned in relation to each other.

Figure 2A:
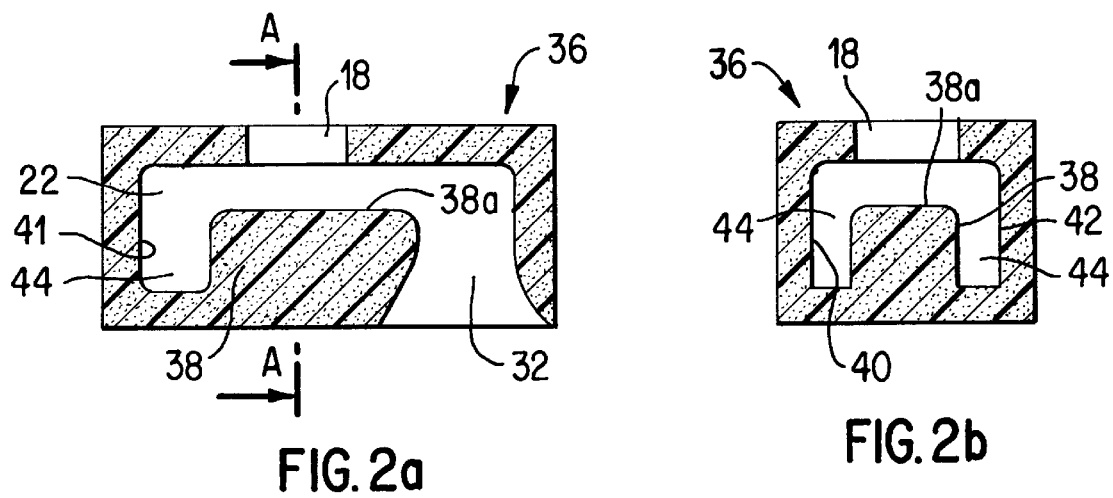
FIG. 2a is a diagrammatic view similar to that of FIG. 1a of a second embodiment of the means for attenuating the parasitic ultrasonic waves.
Figure 2B:
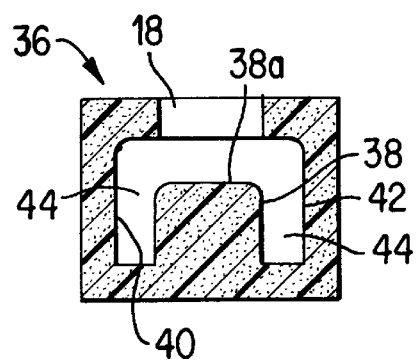
FIG. 2b is a sectional view of FIG. 2 along A—A.

According to a second embodiment mode of the invention, the means 36 for attenuating the ultrasonic parasitic waves are those represented on FIGS. 2*a* and 2*b*.

The wall 38 of the chamber 22 situated opposite the inlet 18 is warped towards the inside of said chamber in the direction of said inlet and thus forms a central projection which provides with the other walls 40, 41 and 42 a channel partially encircling said central projection. The walls of the chamber are made of a material absorbing the ultrasonic waves. The channel 44 constitutes a trap for the ultrasonic waves which reflect many times on losing energy after having firstly been reflected onto the upper face 38*a* of the central projection 38.

The wall 38 is warped so as to be used as a screen between the inlet 18 and the outlet 32, thus preventing the direct passage, that is without reflections, of the parasitic ultrasonic waves from the inlet towards the outlet.

Figure 3:
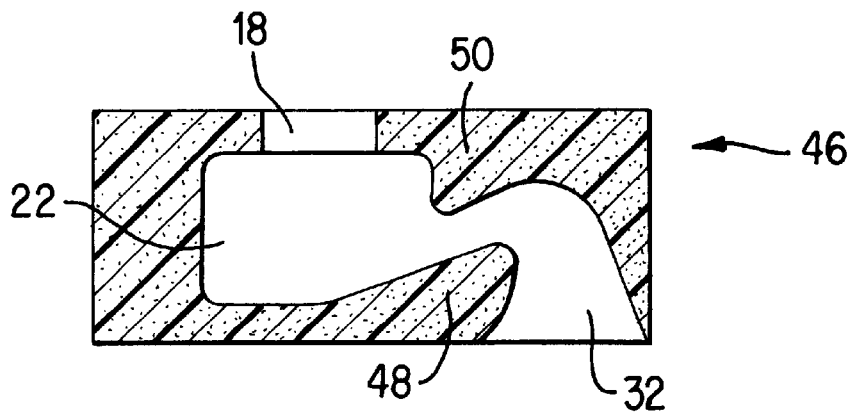
FIG. 3 is a diagrammatic view of a first embodiment variant of the attenuation means shown on FIG. 2a, FIG. 4 is a diagrammatic view of a second embodiment variant of the attenuation means shown on FIG. 2a, FIG. 5 is a diagrammatic view of a third embodiment variant of the attenuation means shown on FIG. 2a, FIG. 6 is an enlarged diagrammatic view similar to that of FIG. 1a of a third embodiment of the means for attenuating the parasitic ultrasonic waves.

According to an embodiment variant, the means 46 for attenuating the ultrasonic parasitic waves are those shown on FIG. 3.

On this figure, the walls 48 and 50 of the chamber 22 which are opposite each other are warped upstream of the outlet 32 towards the inside of said chamber and in the direction in relation to each other so as to form a narrowing area for the gas flow.

The warped walls thus form a screen between the inlet 18 and the outlet 32 in relation to the ultrasonic waves and accordingly make them deflect onto the absorbing material constituting the walls of the chamber 22 before reaching said outlet 32.

The applicant has in this instance also noted an extremely clear attenuation of the noise level.

Figure 4:
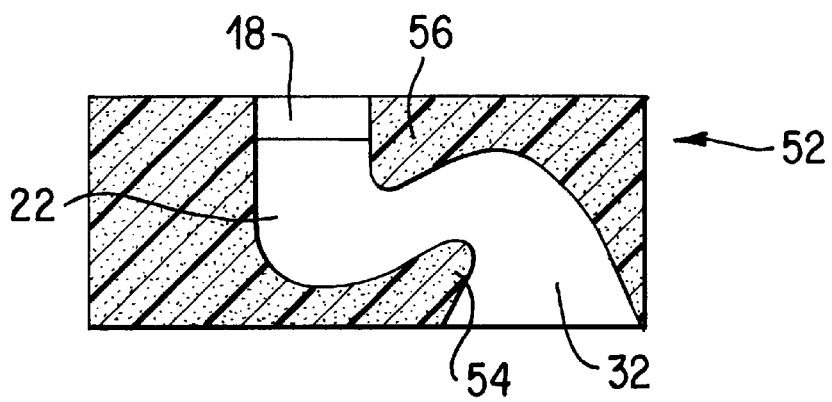

According to another variant of the means 52 for attenuating the parasitic ultrasonic waves shown on FIG. 4, the walls 54, 56 made of a material absorbing the ultrasonic waves of the chamber 22 are warped towards the inside of said chamber so as to give the chamber the shape of a siphon.

Having regard to this configuration, the parasitic ultrasonic waves which free the inlet 18 of the chamber are submitted to multiple reflections before reaching the outlet 32 where their amplitude is significantly attenuated.

Figure 5:
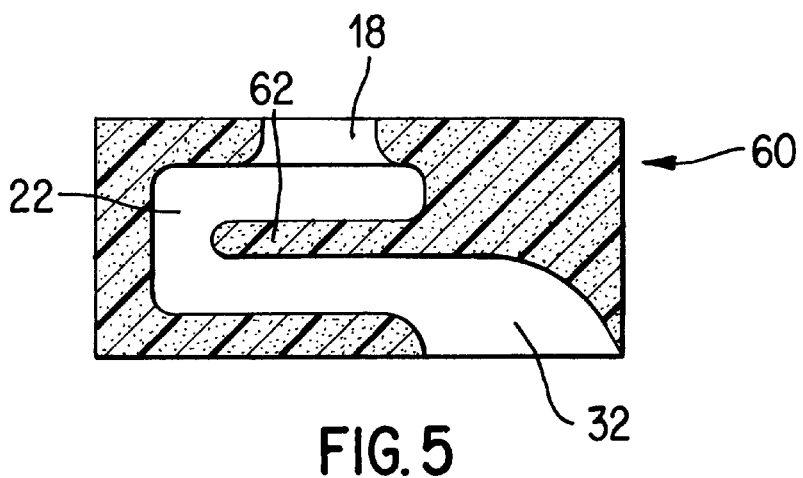

As represented on FIG. 5, according again to another variant, the means 60 for attenuating the parasitic ultrasonic waves have a wall 62 extending in front of the inlet 18 of the chamber 22 perpendicular to the direction of the gas flow flowing into said inlet so as to hide the outlet 32 from the parasitic ultrasonic waves coming from the inlet.

The warped wall forces the gas flow to follow a sinuous route along which the parasitic ultrasonic waves carried by said flow are reflected several times onto the absorbent walls of the chamber 22. This configuration results for example in attenuating by 40 decibels every ten years the noise level propagated by the gas flow.

Figure 6:
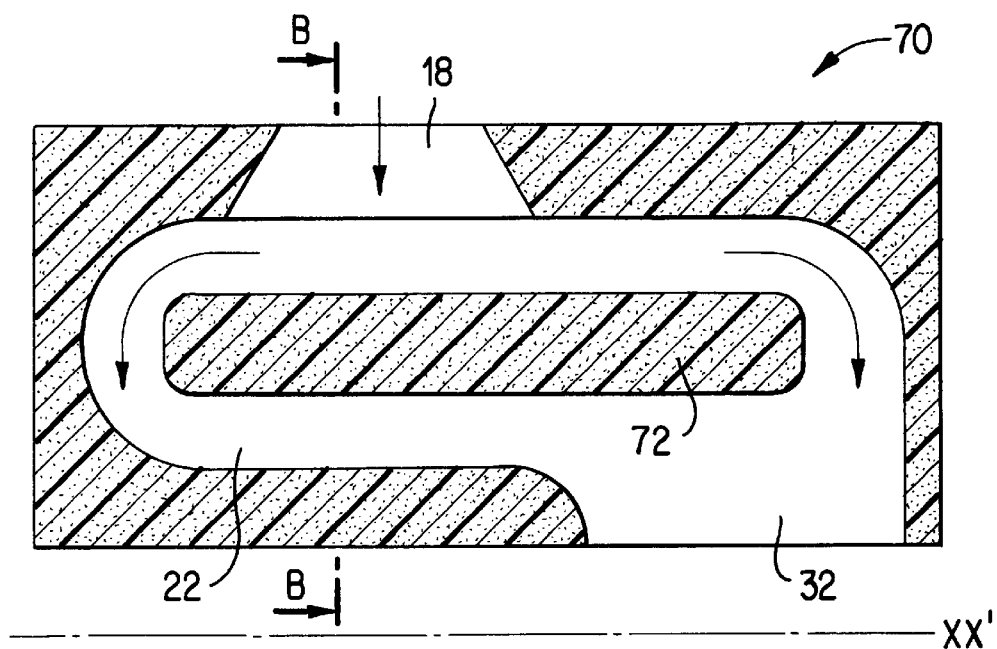
FIG. 6a is a sectional view of FIG. 6 along B—B.
FIG. 6b is a diagrammatic view of a first embodiment variant of the attenuation means shown on FIGS. 6 and 6a within the same cutting plane as that of FIG. 6a, FIG. 7 is a reduced diagrammatic view of a second embodiment variant of the attenuation means shown on FIG. 6.

So as to simultaneously obtain a high degree of attenuation of the parasitic ultrasonic waves and an acceptable head loss for the gas flow, a third embodiment of the invention is represented on FIG. 6. According to this FIG., the means 70 for attenuating the parasitic ultrasonic waves comprise an obstacle 72 housed in the chamber 22 of the gas counter between the inlet 18 and the outlet 32 of said chamber.

Figure 6A:
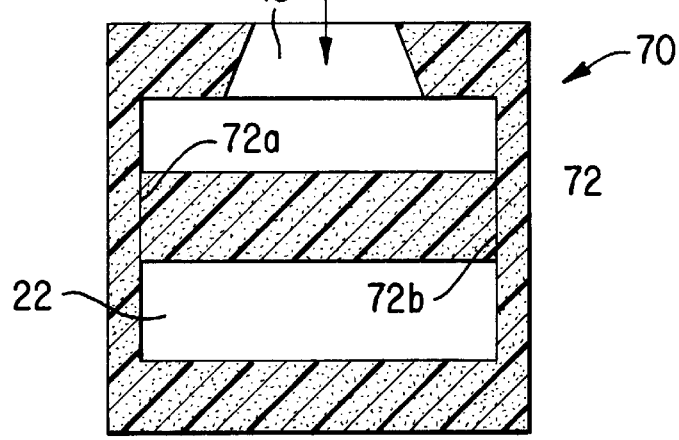

The obstacle 72 with, for example, the shape of a parallelepiped is placed opposite the inlet 18 and extends along the entire dimension of the chamber in a direction perpendicular to the axis XX' (FIG. 6a). The obstacle is fixed at its opposing extremities 72a and 72b to the opposing walls of the chamber 22 and the gas flow coming from the inlet 18 is thus divided into two flows by said obstacle, as shown on FIG. 6.

The obstacle 72 is used as a screen between the inlet and outlet for the parasitic ultrasonic waves propagated by the gas flow coming from the inlet and thus forcing said waves to form multiple reflections on the walls of the chamber and the obstacle.

The walls of the chamber and the obstacle are made of a material absorbing the ultrasonic waves as described above with the result that the parasitic ultrasonic waves, which have undergone a large number of reflections after traversing the chamber 22, have a significantly attenuated pressure amplitude.

Figure 6B:
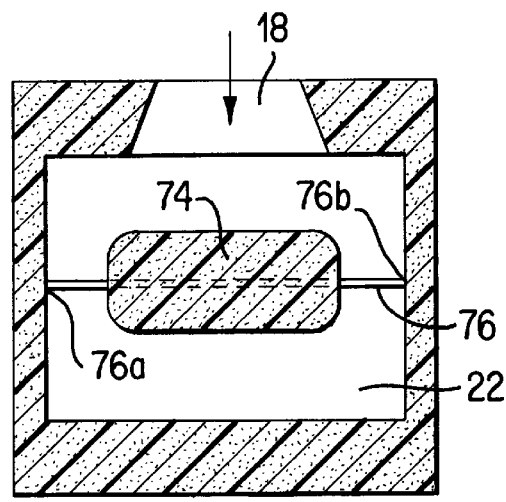

It is to be noted that the obstacle does not necessarily have said shape and may by example have a shape enabling the gas flow to circulate all around said obstacle. In this case, the obstacle 74 is for example kept in place in the chamber 22 by means of a rod 76 which traverses it and which is fixed via its two opposing extremities 76a and 76b to the opposing walls of the chamber 22 (FIG. 6b).

Figure 7:
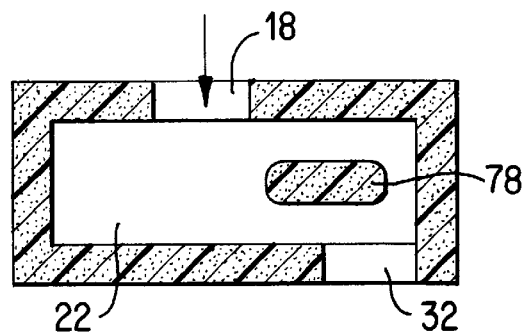

It is also possible to provide an obstacle 78 as shown on FIG. 7 and on which the obstacle is not situated opposite the inlet 18.

The obstacle element 78 is then disposed opposite the outlet so as to prevent the direct passage of the parasitic ultrasonic waves from the inlet to the outlet.

This configuration is advantageous when it is desired to place an element for cutting off the gas flow in the space provided in the chamber 22 opposite the inlet.

Figure 8:
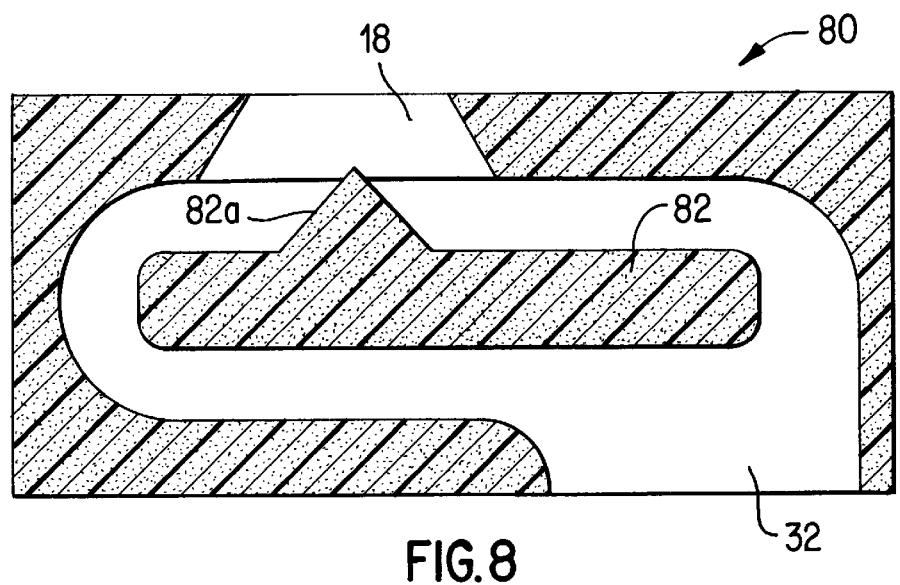
FIG. 8 is a diagrammatic view of a third embodiment variant of the attenuation means shown on FIG. 6.

So as to facilitate the separation of the gas flow coming from the inlet 18 into at least two gas flows, the obstacle 82 may be given a profiled shape 82a opposite said inlet and extending towards the latter, as shown on FIG. 8.

So as to increase the effectiveness of this flow separator, the profiled shape advantageously extends into the inlet 18.

The profiled shape 82a given to the parallelepiped obstacle 82 has a triangular section inside the plane of FIG. 8 and has for example the shape of a cone when the inlet 18 has a triangular passage section.

Figure 9:
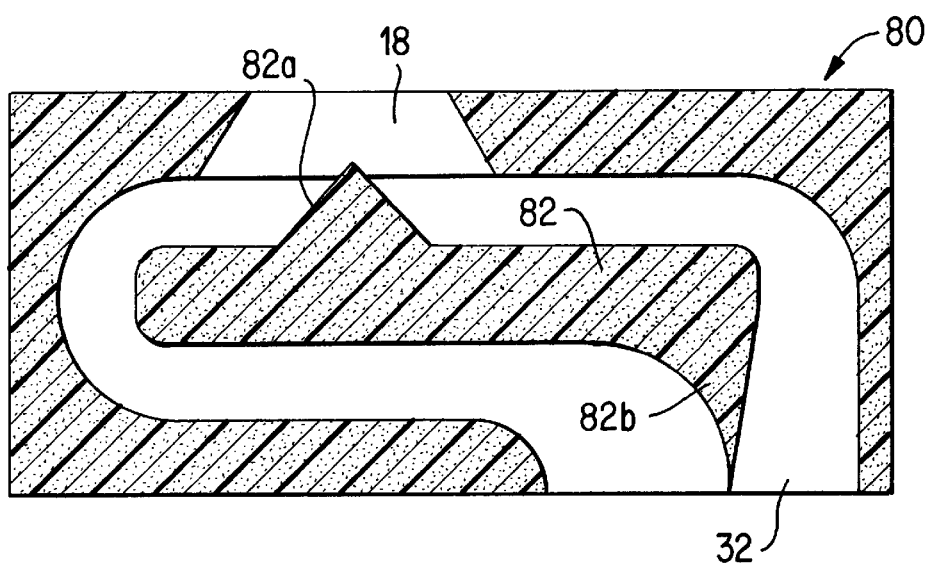
FIG. 9 is a diagrammatic view of a fourth embodiment variant of the attenuation means shown on FIG. 6.

So as to reduce head losses at the location of the chamber 22 where the gas flows penetrate into the outlet 32, it is possible to give the obstacle 82 a profiled shape 82b situated opposite said outlet 32 and extending towards the latter as shown on FIG. 9.

This Figure also shows the profiled shape 82a of the obstacle described with reference to FIG. 8. However, the simultaneous presence of these two profiled shapes is not essential.

The profiled shape 82a carries out in fact the function of a trailing edge on an aircraft wing. The gas flows are thus routed more effectively towards the outlet, thus limiting the head losses.

The profiled shape 82 extends over the entire dimension of the outlet 32 which is perpendicular to the plane of FIG. 9.

In the plane of FIG. 9, the profiled shape 82b has two walls each approximately reproducing the contour of the wall of the chamber 22 which is situated opposite, thus providing the gas flow with a slight passage section increase.

The two walls of the profiled shape 82b are joined together to form an edge extending into the outlet 32.

It should be pointed out that it is possible to combine the characteristics of the first and second embodiments so to obtain the attenuation means including walls made of a material absorbing the ultrasonic waves warped towards the inside of the chamber, as well as an obstacle.

It is possible to have attenuation means in which the obstacle alone is embodied from a material absorbing the ultrasonic waves.

Figure 10:
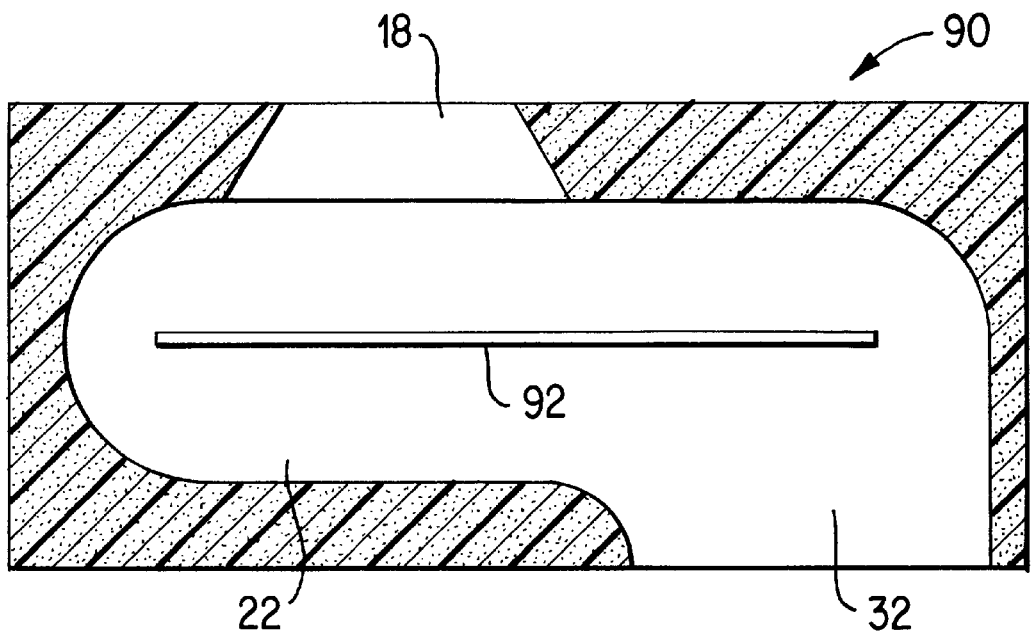
FIG. 10 is a diagrammatic view similar to that of FIG. 6 of a fourth embodiment of the means for attenuating the parasitic ultrasonic waves.

According to a fourth embodiment mode of the invention shown on FIG. 10, the means for attenuating the parasitic ultrasonic waves include an obstacle 92 housed in the chamber 22 of the gas counter between the inlet 18 and the outlet 32 so as to be used as a screen for the ultrasonic waves between the inlet and the outlet.

The obstacle 92 is made of a material reflecting the ultrasonic waves, such as a cardboard or plastic sheet, and appears in the form of parallelepiped-shaped plate with a thickness of 1 mm. The plate extends along a direction perpendicular to the plane of FIG. 10 and is fixed via its two opposing extremities to the opposing walls of the chamber 22. The walls of the chamber 22 are made of a material absorbing the ultrasonic waves, as previously described. Thus, the parasitic ultrasonic waves generated at a frequency of 40 Hz derived from the inlet 18 are reflected onto the obstacle 92 and then onto the walls of the chamber where they lose a large amount of energy before reaching the outlet 32.

The reflecting obstacle is not necessarily situated opposite the inlet 18. However, when the obstacle is situated opposite the inlet, the parasitic ultrasonic waves reflect onto it and are directly routed onto the walls of the chamber and then again onto the obstacle, and successively multiple reflections of the waves are observed on the obstacle and the walls, thus making it possible to significantly attenuate the amplitude of these waves and consequently reduce the acoustic level.

The obstacle element can be placed opposite the outlet 32. Therefore, the parasitic ultrasonic waves will be first reflected and attenuated by the walls of the chamber 22 before encountering the reflecting obstacle which will direct them again onto the walls where they are again reflected which will further accentuate their attenuation.

So as to increase the attenuation effectiveness of the ultrasonic waves, the attenuation means 94 shown on FIG. 11 include a combination of an obstacle 96, as described with respect to FIG. 6 under reference 72, and a reflecting obstacle 92, as described with reference to FIG. 10, the walls of the chamber of the walls 22 being made of a material absorbing the ultrasonic waves. Thus, a composite obstacle with a reflecting portion 92 and an absorbing portion 96 is obtained.

The reflecting obstacle 92 fully suppresses any direct path of the ultrasonic waves from the inlet 18 towards the outlet 32 and the absorbing obstacle 96 helps to attenuate the amplitude of the ultrasonic waves. Given the fact that the obstacle 96 is made of a material absorbing ultrasonic waves, it is not essential that the walls of the chamber be also absorbent.

However, when the walls of the chamber are also made of a material absorbing ultrasonic waves, the effectiveness of the attenuation means is greater.

The applicant has therefore been able to observe a reduction of noise of about 50 decibels.

Figure 11:
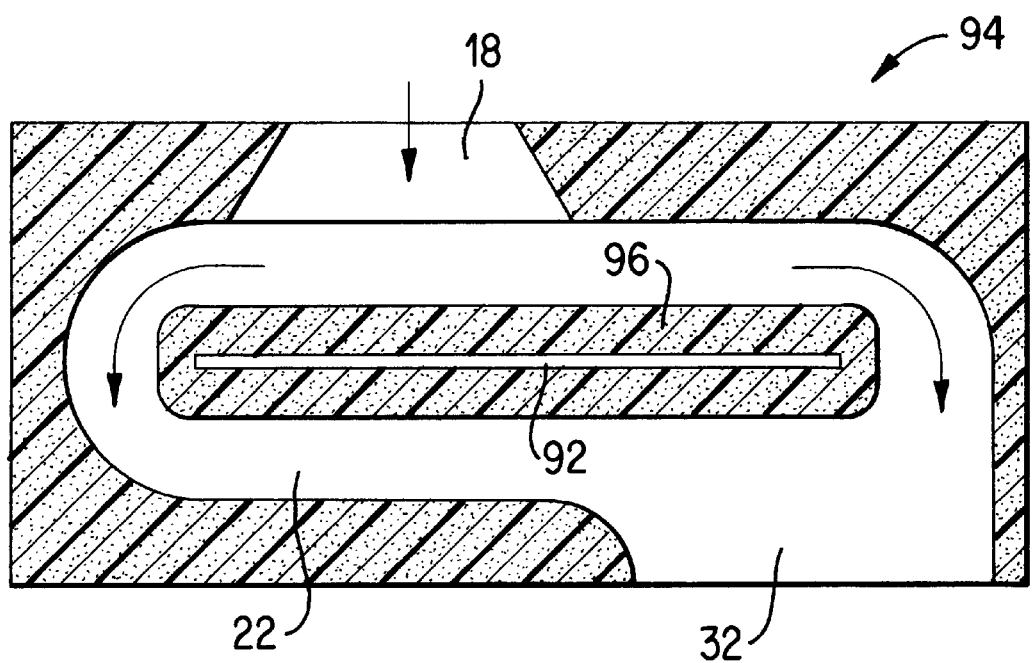
FIG. 11 is a first embodiment variant of the attenuation means shown on FIG. 10.
Figure 11A:
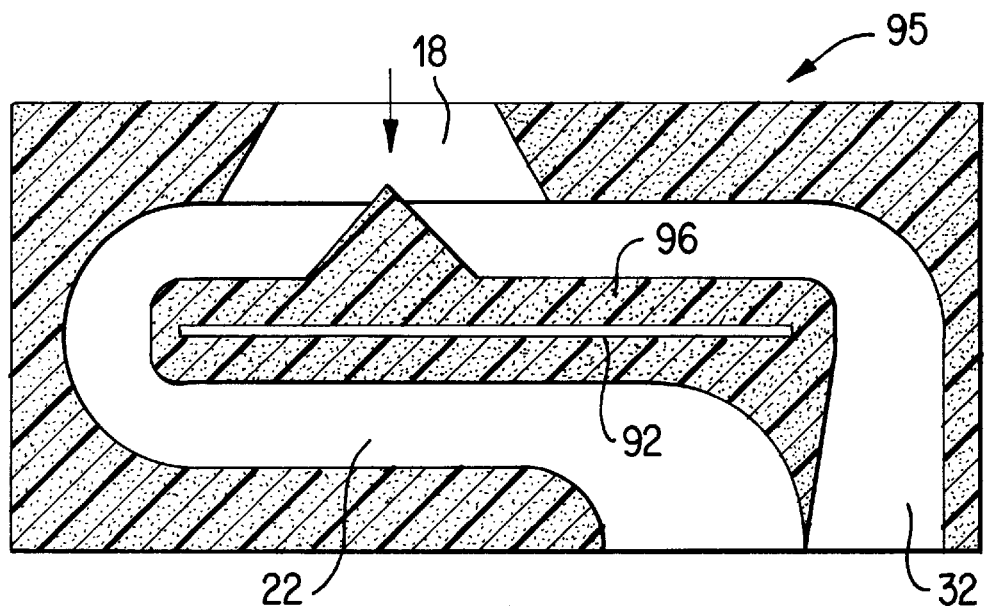
FIG. 11a is a second embodiment variant of the attenuation means shown on FIG. 10.

It is also possible to profile the obstacle opposite the inlet 18 and the outlet 32 as described with reference to FIGS. 8 and 9, and the attenuation means 95 shown on FIG. 11a are thus obtained. The thickness of the obstacle is 10 mm.

With these means, the attenuation is for example 50 decibels for a head loss of about 20 Pa with a gas flowrate of 6 m$^3$/h.

Figure 12:
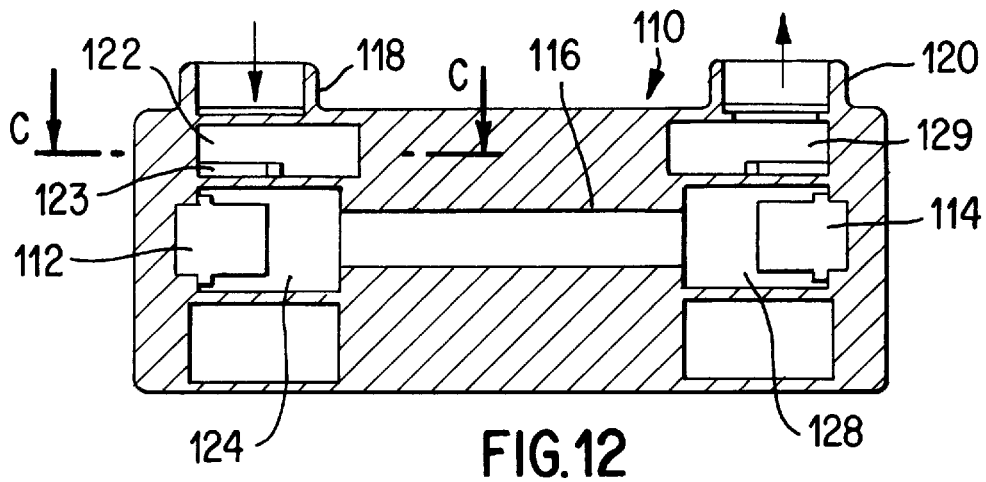
FIG. 12 is a longitudinal cutaway diagrammatic view similar to that of FIG. 1 of another ultrasonic gas counter configuration.
Figure 13:
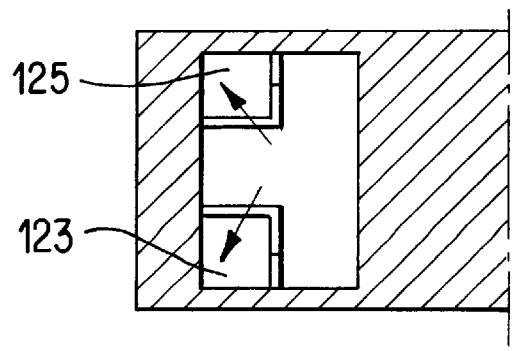
FIG. 13 is a partial sectional view of FIG. 12 along C—C.

Although the various means for attenuating parasitic ultrasonic waves have been described in relation to a gas counter as shown on FIG. 1, these systems are applicable to any type of ultrasonic counter and any configuration such as the one shown on FIGS. 12 and 13.

As regards the gas counter 100 shown on FIGS. 12 and 13, the gas flow penetrates via the inlet 118 and flows into the chamber 122 whose wall situated opposite said entry comprises two openings 123, 125 forming outlets for the gas to flow.

The gas flow hits said wall and is broken into two portions which each rush into one of the outlet openings of the chamber 122.

In accordance with the invention and the previous description, the means for attenuating the parasitic ultrasonic waves are placed in the chamber 122 and comprise walls made of a material absorbing ultrasonic waves.

The attenuation means may also include an obstacle absorbing and/or reflecting ultrasonic waves.

It is also possible that the attenuation means comprise an obstacle absorbing the ultrasonic waves, but in which the walls of the chamber are not made of a material absorbing the ultrasonic waves or in which the obstacle is both absorbent and reflecting but the walls are not absorbent.

Thus, as shown on FIGS. 14 and 15 and similarly to what has been described with reference to FIGS. 6 and 6a, the means for attenuating the parasitic ultrasonic waves include an absorbent obstacle 172 disposed in the chamber 122 between the inlet 118 and the outlets 123, 125 and serving as a screen for said parasitic ultrasonic waves.

The walls of the chamber 122 are made of a material absorbing the ultrasonic waves It is also possible to provide an obstacle as shown on FIG. 6b.

The invention is also applicable to an ultrasonic fluid counter comprising aligned inlet and outlets.

Figure 16:
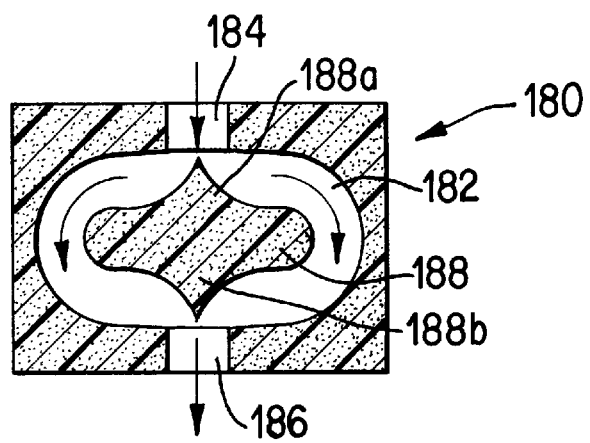
FIG. 16 is a cutaway view of another example of the means for attenuating the parasitic ultrasonic waves for an ultrasonic gas counter in which the inputs and outputs for gas flowing are aligned.

For example, the means for attenuating the parasitic ultrasonic waves associated with this counter may take the form shown on FIG. 16. According to this figure, the attenuation means 180 embodied in the form of a chamber 182 include in the alignment an inlet 184 and an outlet 186 for the fluid flow, as well as an obstacle 188 forming a screen between the inlet and outlet for the parasitic ultrasonic waves.

Figure 14:
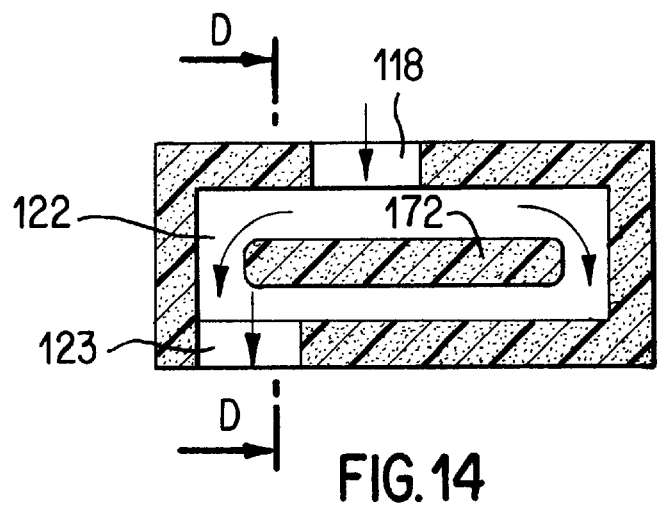
FIG. 14 is an enlarged sectional diagrammatic view of the attenuation means similar to those of FIG. 6 and applied to the gas counter shown on FIG. 12.
Figure 15:
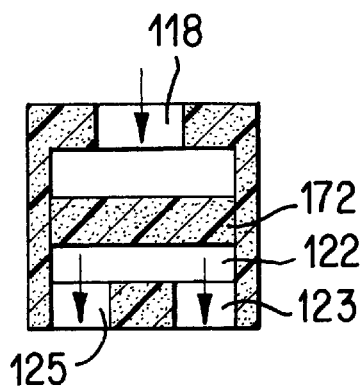
FIG. 15 is a sectional view of FIG. 14 along D—D.

The obstacle is for example fixed at two opposing extremities to the opposing walls of the chamber similarly to the obstacle 172 of FIGS. 14 and 15. Thus, the fluid flow is separated into two flows.

It is also possible to have an obstacle like the one shown on FIG. 6b, and around which the fluid flow circulates.

The obstacle shown on FIG. 16 has two profiled shapes 188a and 188b respectively situated opposite the inlet 184 and outlet 186 and extending towards the latter and giving said obstacle the general shape of a spinning top.

According to this FIG., the obstacle and walls of the chamber are made of a material absorbing the parasitic ultrasonic waves. Similarly to what was described earlier, the walls cannot absorb the ultrasonic waves.

It is also possible to provide absorbent walls and an obstacle absorbing and/or reflecting the ultrasonic waves or even non-absorbent walls and an obstacle absorbing and reflecting the ultrasonic waves.

As regards what was described with reference to FIGS. 1 to 16, it is proper to note that when the attenuation means include an obstacle and walls made of a material absorbing the ultrasonic waves, the material used for the walls does not have to be the same as that of the obstacle.

It ought to be mentioned that the attenuation means 180 can also be applied to an ultrasonic fluid counter in which the inlet and outlet of said counter are not aligned (FIG. 1 and FIG. 2).

The invention is also applicable to an ultrasonic fluid counter in which two or more than two ultrasonic frequencies are used for the measurement between the ultrasonic transducers. In this case, the attenuation means are selected so as to attenuate the ultrasonic waves at the frequencies used by the fluid counter.

The invention is applicable in particular to a fluid counter as described in the patent GB 2 275 108 in which two different ultrasonic frequencies are used to propagate ultrasonic waves between the transducers.

In this case, the material making up the walls and/or obstacle needs to be selected so as to absorb the parasitic ultrasonic waves transmitted on these two frequencies by a source outside the counter.

Certain ultrasonic measuring methods use a variable frequency inside a range of ultrasonic frequencies and here the invention can also be applied to fluid counters in which these methods are implemented.

In addition, it is proper to note that an ultrasonic fluid counter can be associated with means for attenuating the parasitic ultrasonic waves disposed downstream of the ultrasonic measuring path and for example in the chamber 29 of the counter of FIG. 1 or in the chamber 129 of the counter of FIG. 12 so as to prevent any external source situated downstream of said counter disturbing the functioning of the latter at the working frequency or frequencies used by the transducers.

FIG. 17 represents two curves A and B which translate the noise spectrum measured downstream of the ultrasonic gas counter of FIG. 1 without with means for attenuating the parasitic ultrasonic waves (curve A) and with the means for attenuating the parasitic ultrasonic waves shown on FIGS. 2a and 2b (curve B).

This shows a reduction of 10 decibels per ten years of the noise level measured downstream of the counter with the selected attenuation means.

With the attenuation system shown on FIG. 11a, this reduction may reach 50 decibels.

Figure 18A:
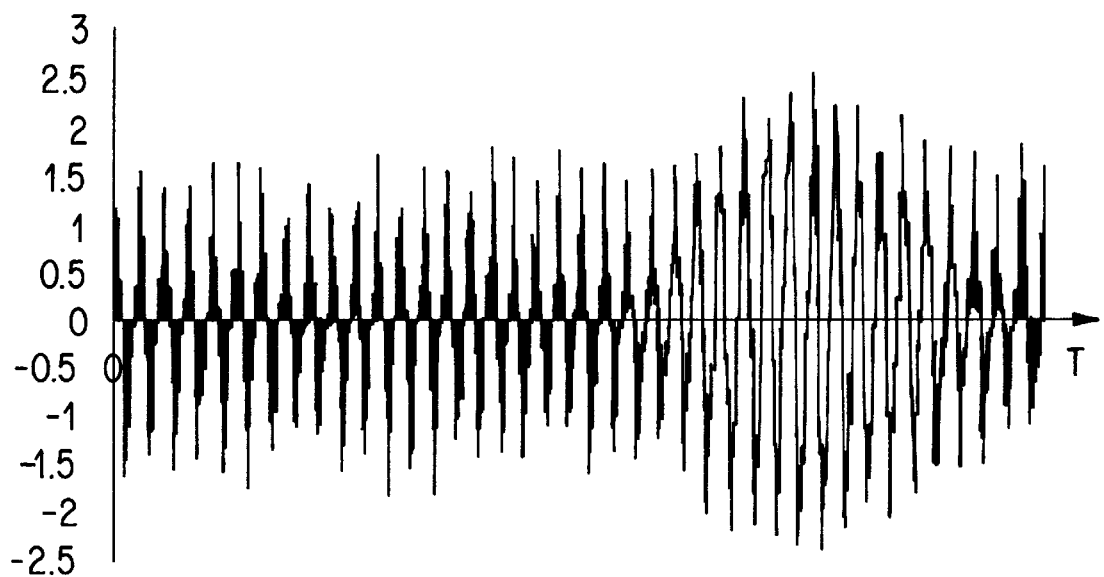
Figure 18B:
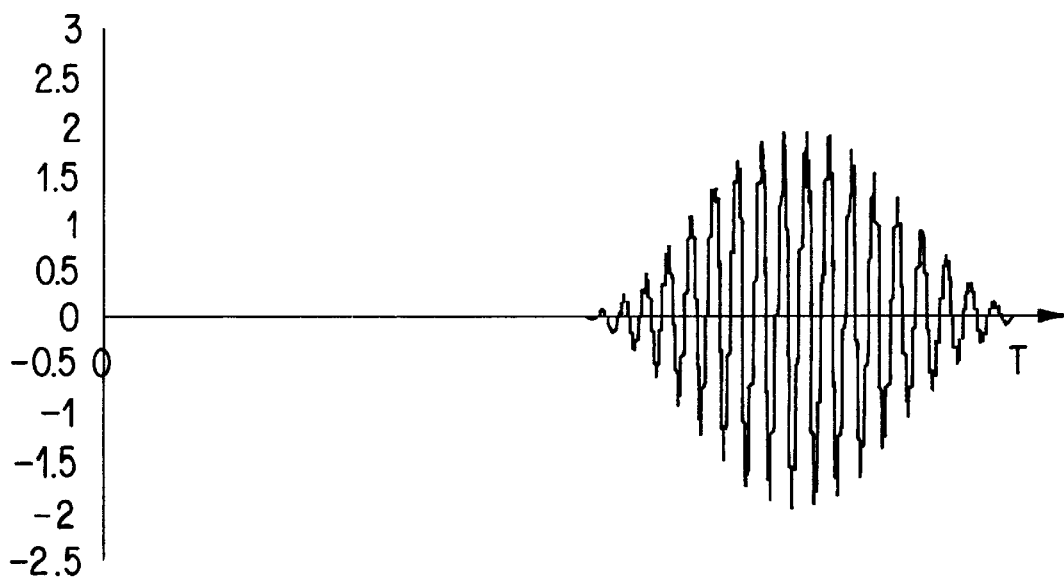

The effectiveness of the means for attenuating the parasitic ultrasonic waves of the invention is abundantly clear and FIGS. 18a and 18b perfectly illustrate this effectiveness.

FIG. 18a represents the nature of an ultrasonic signal received by one of the ultrasonic transducers following the emission of a signal by the other transducer in the presence of an external noise source situated upstream of the counter of FIG. 1 without any means for attenuating the parasitic ultrasonic waves. It is perfectly clear that this signal cannot be exploited.

On the other hand, when the means for attenuating the parasitic ultrasonic waves as shown on FIG. 11 are associated with the counter of FIG. 1, the nature of the ultrasonic signal received by this same transducer in the presence of the same external noise source is the one shown on FIG. 18b.

Figure 19:
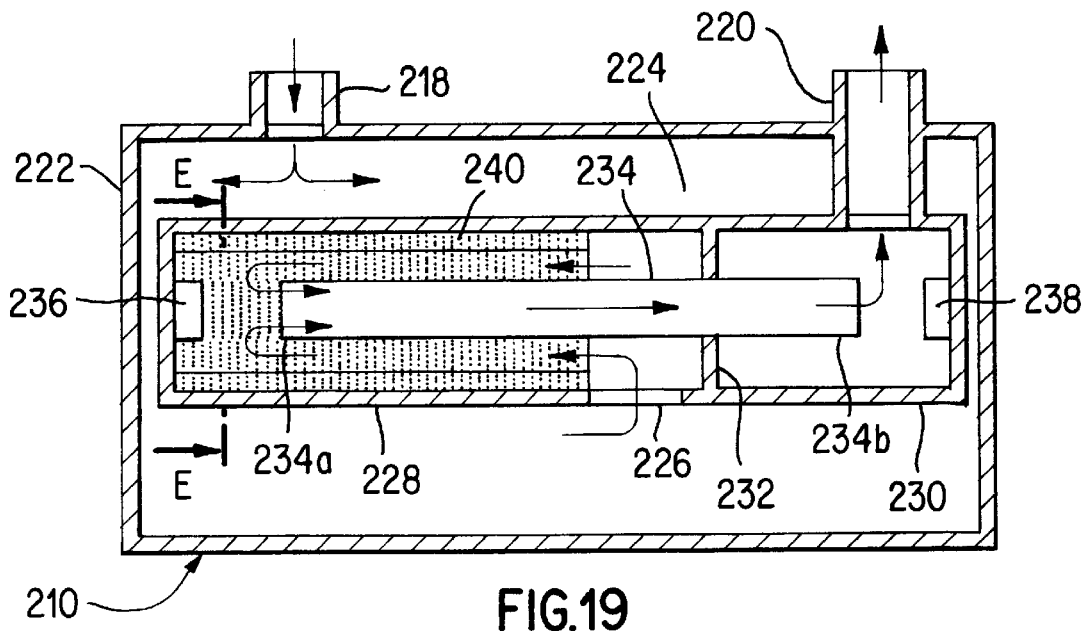
FIG. 19 is a longitudinal cutaway diagrammatic view of a third ultrasonic gas counter configuration representing another embodiment of the attenuation means.
Figure 20:
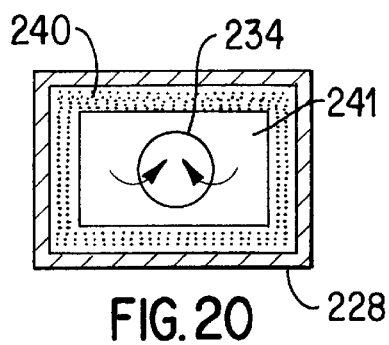
FIG. 20 is a sectional view of FIG. 19 along E—E.

A further embodiment of the attenuation means of the invention is shown on FIGS. 19 and 20.

The gas counter 219 shown on FIG. 19 includes an intake opening 218 and a gas evacuation opening 220.

The gas flow derived from the opening 218 penetrates into a chamber 222 where it is distributed around a measuring block 224 and rushes into said block via a window 226 fitted in the lower portion of the block.

The measuring block includes two measuring chambers 228 and 230 separated by a partition 232 and a measuring pipe 234 embodied in the form of a tube or conduit, as described in the European patent n° 0 538 930, whose internal surface has an ellipsoid shape and which has inside along its major axis an ogive-shaped obstacle so as to form an annular passage around said obstacle.

The axial pipe 234 traverses the partition 232 and partly penetrates the chambers 228 and 230 by a certain length.

Two ultrasonic transducers 236, 238 are respectively disposed opposite the two extremities 234a, 234b of the measuring pipe 234.

In the configuration described in the European patent n° 538 930, the ultrasonic transducers are disposed respectively at the central points of the ellipsoid so that all the ultrasonic waves emitted by one of the transducers inside the pipe are reflected by the internal surface of the ellipsoid and received by the other transducer, the obstacle being disposed between the transducers so as to avoid a direct path between them.

The means for attenuating the parasitic ultrasonic waves are made in the form of a material 240 absorbing said waves and fitted in the measuring chamber 228 around the pipe 234 so as to provide at the periphery of the latter a space 241 (FIG. 20) in which the gas flows after having traversed the window 226.

The gas flows in this space 241 along the pipes 234 as far as the extremity 234a where it makes a half-turn so as to rush into said pipe before coming out again into the measuring chamber 230 via the extremity 234b and being evacuated through the opening 220.

As shown on FIG. 20, the absorbent material 240 is in contact with the internal walls of the chamber 228 on a portion of the penetrating length of the measuring pipe. The free space around the pipe in the direct proximity of the partition 232 is left free for the gas flow.

The absorbent material is also disposed around the extremity 234a upstream of the measuring pipe so as to ensure that the flow penetrating into the pipe does not carry any of extremely few parasitic ultrasonic waves generated outside the counter.

The absorbent material can marry the shape of the internal walls of the chamber 228 or assume other shapes.

The length on which the absorbent material is fitted is sufficiently large so as to ensure that the parasitic ultrasonic waves shall be subjected to multiple reflections which shall considerably favour the attenuation of these waves. So as to have a sufficiently large length, it is possible to disposed the measuring pipe 234 disymmetrically with respect to the partition 232 so that the penetrating length of said pipe into the chamber 228 is greater than that of the chamber 230, as shown on FIG. 19.

The absorbent material used may be the same as the one described previously for the other embodiments.

Figure 21:
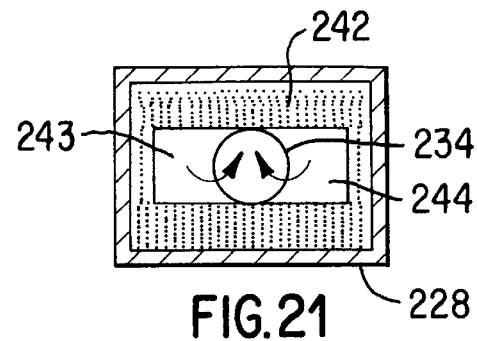
FIGS. 21 to 23 are embodiment variants of FIG. 20.

By way of a variant, FIG. 21 shows that the absorbent material 242 can come into tangential contact with the outer surface of the measuring pipe 234 so as to provide on both sides of the latter two spaces 243, 244 embodied in the form of longitudinal channels. The attenuation effectiveness is increased with respect to the configuration of FIG. 20 as the thickness of the material is larger in the configuration of FIG. 21, and as the flow is separated into two portions, it is more in contact with the absorbent material.

With the configuration of FIG. 21, it is possible to attenuate the noise level present in the flow by 30 dB per ten years with a material thickness of 5 mm, a length of an absorbent material of 80 mm and cross section dimensions (plane of FIG. 21) of 56×42 mm.

Figure 22:
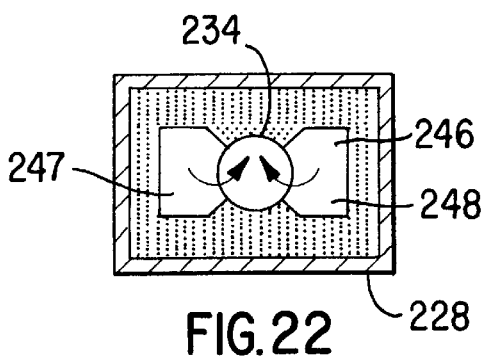

FIG. 22 illustrates another embodiment variant in which the absorbent material 246 in contact with a larger surface of the measuring pipe 234 than in the configuration of FIG. 21 so as to form two longitudinal channels 247, 248. This disposition of the absorbent material is advantageous given the fact that the gas flow is more in contact with the absorbent material than in the configuration of FIG. 21.

In addition, the measuring pipe 234 is thus kept between two absorbent material portions which makes it possible to prevent said measuring pipe from vibrating.

Moreover, this disposition of the absorbent material facilitates the installation of the measuring block 234 in the measuring block 224 since the location of said pipe is preshaped in the absorbent material 246.

Figure 23:
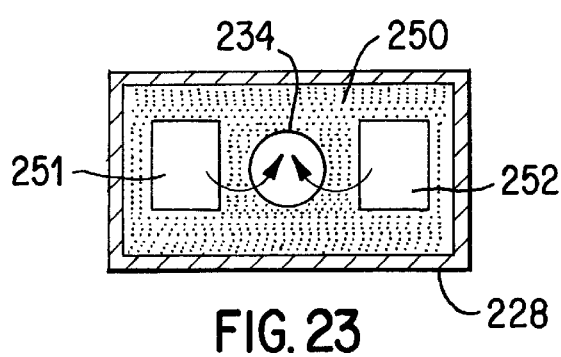

In the variant shown on FIG. 23, the absorbent material 250 fully surrounds the measuring pipe 234 so as to form two longitudinal channels 251 and 252 which are not in contact with said pipe and which are thus surrounded on all parts by the absorbent material.

Accordingly, attenuation is even more effective than in the configuration of FIG. 22.

The configurations of the absorbent material shown on FIGS. 20 to 23 can also be disposed in the measuring chamber 230 downstream of the measuring path if the noise source is situated downstream of the counter.

In this case, it is essential that the penetrating length of the measuring pipe into the chamber 230 is larger than that of the chamber 228.

If it is necessary to dispose the absorbent material upstream and downstream of the measuring path, it is preferable that the pipe is not disposed too disymmetrically with respect to the partition 232.

The shape of the channels 247, 248 and 251, 252 shown on FIGS. 22 and 23 may vary and may have rounded portions so as to improve the passage of the gas flow.

What is claimed is:

1. An ultrasonic fluid counter including:

fluid intake and evacuation openings, at least two ultrasonic transducers collectively defining an ultrasonic measuring path and transmitting and receiving ultrasonic waves in the fluid along said ultrasonic measuring path according to at least one ultrasonic frequency, means for attenuating the parasitic ultrasonic waves generated outside said fluid counter and transmitted by the fluid according to the ultrasonic frequency(cies), said means being disposed between the external source and the ultrasonic measuring path and being made, at least partly, of a material absorbent to the ultrasonic frequency (cies) used in the counter, a chamber between one of the openings and the ultrasonic measuring path in which the means for attenuating the parasitic ultrasonic waves are disposed, said means for attenuating the parasitic ultrasonic waves including an inlet and at least one outlet for the fluid flow and serving as a screen between the inlet and outlet of said means for the parasitic ultrasonic waves wherein the means for attenuating includes walls made of a material absorbing the ultrasonic waves, said walls being deformed towards the inside of said means for attenuating so as to serve as a screen between the inlet and outlet of said means for attenuating the parasitic ultrasonic waves.

2. A counter according to claim 1, wherein the means for attenuating the parasitic ultrasonic waves are fitted in the chamber so as to offer said parasitic ultrasonic waves with multiple reflections onto the material absorbing the ultrasonic waves.

3. A counter according to claim 1, wherein the means for attenuating the parasitic ultrasonic waves are disposed upstream of the ultrasonic measuring path.

4. A counter according to claim 1, wherein the means for attenuating the parasitic ultrasonic waves are disposed downstream of the ultrasonic measuring path.

5. A counter according to claim 1 and including an axial measuring pipe in which the fluid flows from upstream to downstream and having a portion provided with one extremity penetrating into a measuring chamber over a certain length, the material absorbing the parasitic ultrasonic waves being fitted in said measuring chamber over at least one portion of the penetrating length of the measuring pipe which includes said extremity and so as to provide outside said measuring pipe at least one space in which the fluid flows parallel to the axis of this pipe in a direction opposing the flow of the fluid in said pipe.

6. A counter according to claim 5, wherein a peripheral space is provided around the measuring pipe, the material absorbing the parasitic ultrasonic waves being in contact with the walls of the measuring chamber.

7. A counter according to claim 5, wherein the material absorbing the ultrasonic waves is in contact firstly with the walls of the measuring chamber and secondly with the measuring pipe so as to provide two spaces in the form of channels situated on both sides of said measuring pipe.

8. A counter according to claim 7, wherein the material absorbing the ultrasonic waves fully surrounds the measuring pipe so that the channels are not in contact with said measuring pipe.

9. An ultrasonic fluid counter including:

fluid intake and evacuation openings, at least two ultrasonic transducers collectively defining an ultrasonic measuring path and transmitting and receiving ultrasonic waves in the fluid along said ultrasonic measuring path according to at least one ultrasonic frequency, means for attenuating the parasitic ultrasonic waves generated outside said fluid counter and transmitted by the fluid according to the ultrasonic frequency(cies), said means being disposed between the external source and the ultrasonic measuring path and being made, at least partly, of a material absorbent to the ultrasonic frequency(cies) used in the counter, a chamber between one of the openings and the ultrasonic measuring path in which the means for attenuating the parasitic ultrasonic waves are disposed, wherein the means for attenuating the parasitic ultrasonic waves include at least one obstacle disposed between the inlet and outlet so as to serve as a screen for the parasitic ultrasonic waves wherein the obstacle separates the fluid flow derived from the inlet into at least two flows.

10. A counter according to claim 9, wherein the obstacle is made of a material absorbing the ultrasonic waves.

11. A counter according to claim 9, wherein the obstacle is placed opposite the inlet.

12. A counter according to claim 9, wherein the obstacle has opposite the inlet a profiled form extending towards said inlet so as to favour separation of the flow.

13. A counter according to claim 9, wherein the obstacle has opposite the outlet a profiled form extending towards said outlet.

14. A counter according to claim 9, wherein the shape of the obstacle enables the flow to circulate around said obstacle.

15. A counter according to claim 9, wherein the obstacle includes at least one portion reflecting the ultrasonic waves.

* * * * *